US012797750B2

(12) United States Patent
Hata et al.

(10) Patent No.: US 12,797,750 B2
(45) Date of Patent: Nov. 17, 2026

(54) SOURCE DATA MANAGEMENT PROGRAM, SOURCE DATA MANAGEMENT SYSTEM, AND SOURCE DATA MANAGEMENT METHOD

(71) Applicants: Square Enix Co. Ltd., Tokyo (JP); double jump.tokyo Inc., Tokyo (JP)

(72) Inventors: Keisuke Hata, Tokyo (JP); Atsushi Yoshimeki, Tokyo (JP); Takahide Nojima, Tokyo (JP); Yu Watanabe, Tokyo (JP); Yasuaki Sakamoto, Tokyo (JP); Masaaki Kato, Kyoto (JP)

(73) Assignee: SQUARE ENIX CO., LTD., Tokyo (JP)

( * ) Notice: Subject to any disclaimer, the term of this patent is extended or adjusted under 35 U.S.C. 154(b) by 305 days.

(21) Appl. No.: 18/534,364

(22) Filed: Dec. 8, 2023

(65) Prior Publication Data

US 2024/0189722 A1 Jun. 13, 2024

(30) Foreign Application Priority Data

Dec. 8, 2022 (JP) ................................ 2022-196157

(51) Int. Cl.
*A63F 13/79* (2014.01)
*H04L 9/00* (2022.01)

(52) U.S. Cl.
CPC ................ *A63F 13/79* (2014.09); *H04L 9/50* (2022.05)

(58) Field of Classification Search
None
See application file for complete search history.

(56) References Cited

U.S. PATENT DOCUMENTS

| | | | | |
|---|---|---|---|---|
| 2020/0184431 | A1* | 6/2020 | Sinmao | G06Q 20/389 |
| 2021/0352134 | A1* | 11/2021 | Bjontegard | H04W 12/009 |
| 2023/0014928 | A1* | 1/2023 | Yang | A63F 13/71 |
| 2023/0401595 | A1* | 12/2023 | Kang | G06Q 30/0214 |
| 2024/0100444 | A1* | 3/2024 | Samarthyam | A63F 13/792 |
| 2024/0193712 | A1 | 6/2024 | Hata et al. | |

FOREIGN PATENT DOCUMENTS

| | | | |
|---|---|---|---|
| CN | 115089970 | A | 9/2022 |
| JP | 2002150187 | A | 5/2002 |
| JP | 2020154571 | A | 9/2020 |
| JP | 2021152815 | A | 9/2021 |
| JP | 7195673 | B1 | 12/2022 |

(Continued)

OTHER PUBLICATIONS

Notice of Refusal for JP Application 2024-029241 dated Feb. 28, 2025. pp. 1-5.

(Continued)

*Primary Examiner* — Jason T Yen
(74) *Attorney, Agent, or Firm* — Dorsey & Whitney LLP

(57) ABSTRACT

Non-transitory computer-readable media, systems, and methods are disclosed for source data management. An example non-transitory computer-readable medium stores a source data management program including instructions, when executed by one or more processors, causes a computer to perform operations including: assigning source data based on a token corresponding to a user; and assigning an award to the user based on the source data.

7 Claims, 7 Drawing Sheets

(56) References Cited

FOREIGN PATENT DOCUMENTS

| | | | |
|---|---|---|---|
| KR | 20040011613 | A | 2/2004 |
| KR | 102423989 | B1 | 7/2022 |
| WO | 2022224585 | A1 | 10/2022 |

OTHER PUBLICATIONS

"[Gods Unchained 】 A blockchain game with a prize of 170 million yen", https://web.archive.org/web/20220626013917/https://makÎÔ , Retrieved Feb. 2025, pp. 1-4.
"A New Impact on the NFT Industry! Release of OVO's long-awaited "Fustion (synthes is)" function", PR TIMES | http://web.archive.org/web/20220613075714/https://prtimes.jp/main/html/rd/p/000000081996.html, Jun. 13, 2022, pp. 1-11.
"Anima: The Reign of Darkness Guide Part ② (Iten Fusion and Parameters", https://note.com/zenofasto/n/na1c15e4f1cfa > 08, Feb. 18, 2021, pp. 1-12.
"Gods Unchained—shining forged!", YouTube | https://www.youtube.com/watch?v=A3ODvKzMLZo >, mainly 0:16-0:18,5:33-6:27, Retrieved Feb. 2025, pp. 1-10.
First Office Action dated Oct. 6, 2023 for JP application 2022-196191. pp. 4.
First Office Action dated Nov. 1, 2023 for JP application 2022-196157. pp. 6.
Second Office Action dated May 14, 2024 for JP application 2022-196157.
Notice of Reasons for Refusal for Japanese Patent Application No. 2024-029241, dated Jun. 17, 2025, pp. all.
"How to start and make a Graffiti Racer", complete guide, P2E Hacks [online], http://web.archive.org/web/20221129172814/https://blockchain-game.jp/how-to-start-graffiti-racer/#index_id16, Nov. 29, 2022, pp. all.
"What is a Graffiti Racer (graffiti racer)? Explanation of how to start, play, and make money [NFT game]", MAGUTA [online], http://web.archive.org/web/20221201055732/https://furumaru.jp/graffiti-racer-nft-game/, Dec. 1, 2022, pp. all.

* cited by examiner

SOURCE DATA MANAGEMENT PROGRAM, SOURCE DATA MANAGEMENT SYSTEM, AND SOURCE DATA MANAGEMENT METHOD

CROSS-REFERENCE TO RELATED APPLICATION(S)

The present disclosure claims priority to Japanese Patent Application No. 2022-196157, filed on Dec. 8, 2022, the disclosure of which is expressly incorporated herein by reference in its entirety for any purpose.

TECHNICAL FIELD

At least one embodiment of the present disclosure relates to a source data management program, a source data management system, and a source data management method.

BACKGROUND

Technologies using various tokens such as non-fungible tokens (NFTs) using blockchains have emerged.

Examples of a game system capable of transmitting and receiving in-game non-fungible assets in a game played by a user as NFTs between in-game and out-of-game may be found in JP2021-152815A. The game system includes a game management unit that manages a game, an asset management unit that manages in-game non-fungible assets, and an administrator-side wallet unit that designates mutual addresses between a user wallet unit of a user and the administrator-side wallet unit to transmit and receive NFTs by storing NFTs on blockchains via a network. When in-game non-fungible assets are transmitted to outside of the game, the asset management unit deletes owner information regarding the in-game non-fungible assets, and the administrator-side wallet unit issues an in-game non-fungible asset as an NFT, and transmits the NFT to the wallet address designated by the user.

Incidentally, tokens such as NFTs can be associated with various objects such as characters and items in games, electronic stickers, and digital images.

When source data for assigning awards is assigned to tokens corresponding to users, it is possible to expand token utilization methods and thus improve satisfaction of the users.

When awards such as in-game currency are assigned based on source data accumulated for the foregoing tokens, the token utilization methods can be further expanded and various services can be provided to the users.

SUMMARY

An object of at least one embodiment of the present disclosure is to solve the foregoing problem, expand token utilization methods, and improve satisfaction of a user.

From a non-limiting point of view, a source data management program according to an embodiment of the present disclosure causes a computer to implement a source data assignment function of assigning source data based on a token corresponding to a user, and an award assignment function of assigning an award to the user based on the source data.

From a non-limiting point of view, a source data management system according to an embodiment of the present disclosure includes a communication network, a server, and a user terminal, the system including a source data assignment function of assigning source data based on a token corresponding to a user, and an award assignment function of assigning an award to the user based on the source data.

From a non-limiting point of view, a source data management method by a computer according to an embodiment of the present disclosure is a method including a source data assignment process of assigning source data based on a token corresponding to a user, and an award assignment process of assigning an award to the user based on the source data.

Embodiments of the present application address one or more deficiencies.

DETAILED DESCRIPTION

Hereinafter, embodiments of the present disclosure will be described with reference to the drawings. Various constituent elements in the following embodiments can be appropriately combined within a range in which contradiction or the like does not occur. With respect to the content described as an example of a certain embodiment, description thereof may be omitted in other embodiments. Content of operations and processes that are not related to the features of each embodiment may be omitted. Orders of various processes configuring various flows and sequences to be described below are random as long as there is no contradiction in the processing contents.

Hereinafter, a source data management program executed in a server which is an example of a computer will be described as an example. Here, the computer may be another device such as a user terminal.

Figure 1:
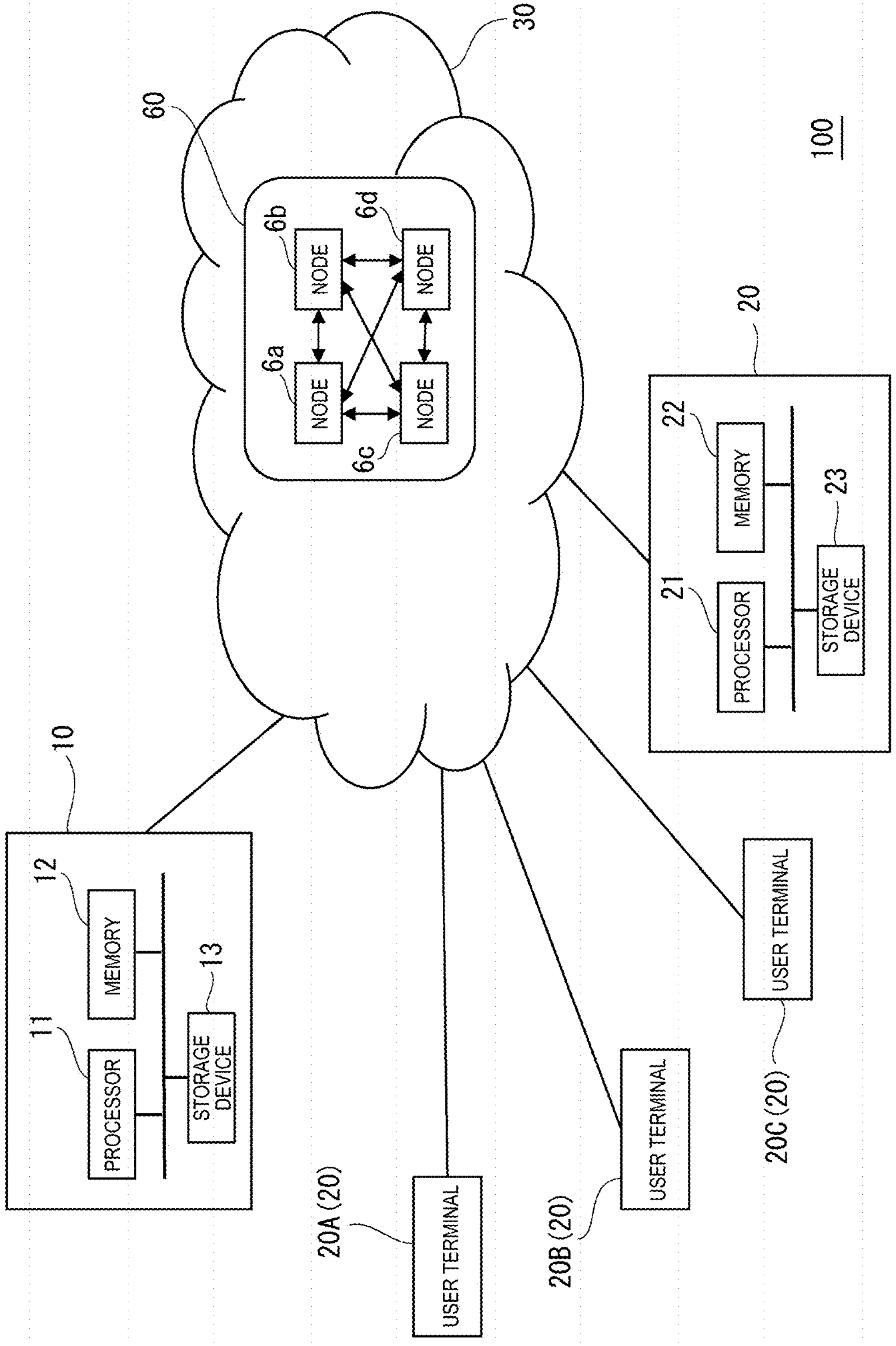
FIG. 1 is a block diagram illustrating an example of a configuration of a source data management system according to at least one embodiment of the present disclosure.

FIG. 1 is a block diagram illustrating an example of a configuration of a source data management system 100 according to at least one embodiment of the present disclosure. The source data management system 100 includes a server 10 and user terminals 20 used by users of the source data management system 100. Each of user terminals 20A, 20B, and 20C is an example of the user terminal 20. The configuration of the source data management system 100 is not limited thereto. For example, the source data management system 100 may be configured such that a single user terminal is used by a plurality of users. The source data management system 100 may include a plurality of servers.

Each of the server 10 and the user terminal 20 is an example of a computer. Each of the server 10 and the user terminal 20 is connected to be able to communicate with a communication network 30 such as the Internet. Connection between the communication network 30 and the server 10 and connection between the communication network 30 and the user terminal 20 may be wired or wireless. For example, the user terminal 20 may be connected to the communication network 30 by executing data communication with a base station managed by a communication service provider via a wireless communication line.

The source data management system 100 includes the server 10 and the user terminal 20 to implement various functions for executing various processes in response to operations of the users.

The server 10 may be a game processing server that controls progress of a game. Here, the server 10 controls the progress of the game in response to an operation of a player. The server 10 may provide various electronic services not limited to a game to the users.

The server 10 includes a processor 11, a memory 12, and a storage device 13. The processor 11 is, for example, a central processing unit (CPU) that executes various types of calculation and control. When the server 10 includes a graphics processing unit (GPU), the GPU may execute some of the various types of calculation and control. The server 10 uses data read to the memory 12 to cause the processor 11 to execute various types of information processing, and the storage device 13 to store the obtained processing results as necessary.

The storage device 13 has a function as a storage medium that stores various types of information. The configuration of the storage device 13 is not particularly limited, but from the viewpoint of reducing a processing load on the user terminal 20, all the various types of information necessary for the control executed by the source data management system 100 may be storable. Such examples include hard disk drives (HDDs) and solid state drives (SSDs). However, the storage device storing various types of information only needs to include a storage area that can be accessed by the server 10, and may be configured to have a dedicated storage area outside of the server 10, for example.

The server 10 may be configured with an information processing device such as a game processing server capable of rendering game images.

The user terminal 20 is managed by the user. Examples of the user terminal 20 include mobile phone terminals, smartphones, personal digital assistants (PDAs), personal computers, tablets, stationary game devices, and portable game devices. The user terminal 20 may be any of virtual reality (VR) goggles, augmented reality (AR) glasses, smart glasses, AR contacts, or other wearable devices which can be operated by a user.

The user terminal may be a communication terminal capable of playing a network distribution type game.

The user terminal 20 is connected to the communication network 30, and includes hardware and software executing various processes by communicating with the server 10. The plurality of user terminals 20 may be configured to be able to directly communicate with each other without involving the server 10.

The user terminal 20 may have a built-in display device. A display device may be wirelessly connected or wired to the user terminal 20. The display device has a very general configuration, and thus illustration is omitted here. The display device is an example of an output device. When the user plays a game using the user terminal 20, a game screen is displayed as a synthesized image on the display device, so that the user recognizes the synthesized image. When the user executes various types of information processing using the user terminal 20, a screen necessary for information processing (information processing screen) is displayed as an image by the display device, so that the user recognizes the image. The game screen and the information processing screen are displayed, for example, on a display which is an example of a display device included in the user terminal or a display which is an example of a display device connected to the user terminal. Examples of the display device include a hologram display device capable of displaying a hologram, a projection device projecting an image (including a game screen and an information processing screen) on a screen or the like, and an XR display device. XR includes VR, AR, mixed reality (MR), and substitutional reality (SR).

The user terminal 20 includes a processor 21, a memory 22, and a storage device 23. The processor 21 is, for example, a CPU that executes various types of calculation and control. When the user terminal 20 includes a GPU, the GPU may execute some of the various types of calculation and control. The user terminal 20 uses data read to the memory 22 to cause the processor 21 to execute various types of information processing, and the storage device 23 to store the obtained processing results as necessary. The storage device 23 has a function as a storage medium that stores various types of information.

The user terminal 20 may have a built-in input device. An input device may be wirelessly connected or wired to the user terminal 20. The input device receives an operation input by a user. A processor included in the server 10 or a processor included in the user terminal 20 executes various control processes in response to an operation input by the user. Examples of input devices include touch panel screens of smartphones, tablets, or the like, keyboards, mouses, game pads, joysticks, and other controllers. A camera built in or connected to the user terminal 20 may also correspond to the input device. The user executes an operation input by a gesture such as a motion of a hand in front of the camera (gesture input).

The user terminal 20 may include other output devices such as speakers. Other output devices output sounds, vibrations, and various other types of information to the user.

The communication network 30 includes a blockchain network 60. The blockchain network 60 is constructed by a plurality of nodes such as computers. As examples of the plurality of nodes, nodes 6*a*, 6*b*, 6*c*, and 6*d* which are each a computer, are illustrated in FIG. 1. The drawing is merely exemplary, and the number of nodes may not be four. The blockchain network 60 may be constructed as a network separate from the illustrated communication network 30.

The plurality of nodes 6*a* to 6*d* are typically interconnected in a peer-to-peer manner to form the blockchain network 60. A distributed ledger is stored in the storage device of each node. The server 10 or the user terminal 20 may be connected to be able to communicate with the blockchain network 60. The server 10 or the user terminal 20 may function as a node included in the blockchain network 60.

Figure 2:
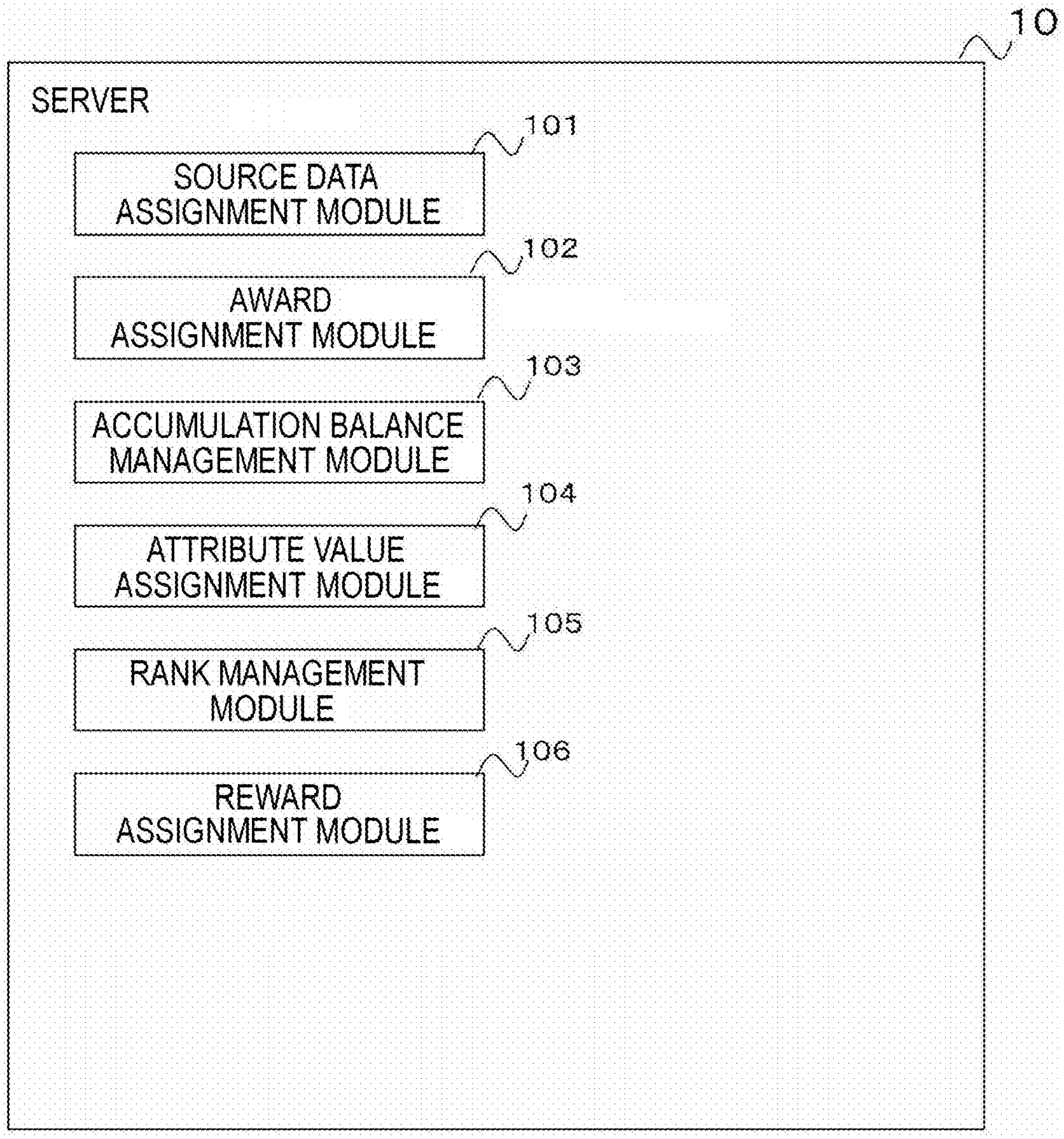
FIG. 2 is a block diagram illustrating a configuration of a server according to at least one embodiment of the present disclosure.

FIG. 2 is a block diagram illustrating a configuration of a server according to at least one embodiment of the present disclosure. The server 10 includes a source data assignment module 101, an award assignment module 102, an accumulation balance management module 103, an attribute value assignment module 104, a rank management module 105, and a reward assignment module 106. The processor included in the server 10 executes the source data management program stored in the storage device with reference to the program to functionally implement the source data assignment module 101, the award assignment module 102, the accumulation balance management module 103, the attribute value assignment module 104, the rank management module 105, and the reward assignment module 106.

The source data assignment module 101 has a function of assigning source data based on a token corresponding to a user.

The award assignment module 102 has a function of assigning an award to the user based on the source data.

The accumulation balance management module 103 has a function of changing an accumulation balance of the source data when a correspondent relation between the user and the token is canceled.

The attribute value assignment module 104 has a function of assigning an attribute value to the user or an object associated with the user according to the accumulation balance of the source data.

The rank management module 105 has a function of changing a rank of the user or the object associated with the user according to the attribute value.

The reward assignment module 106 has a function of assigning a reward to the user according to the rank.

Figure 3:
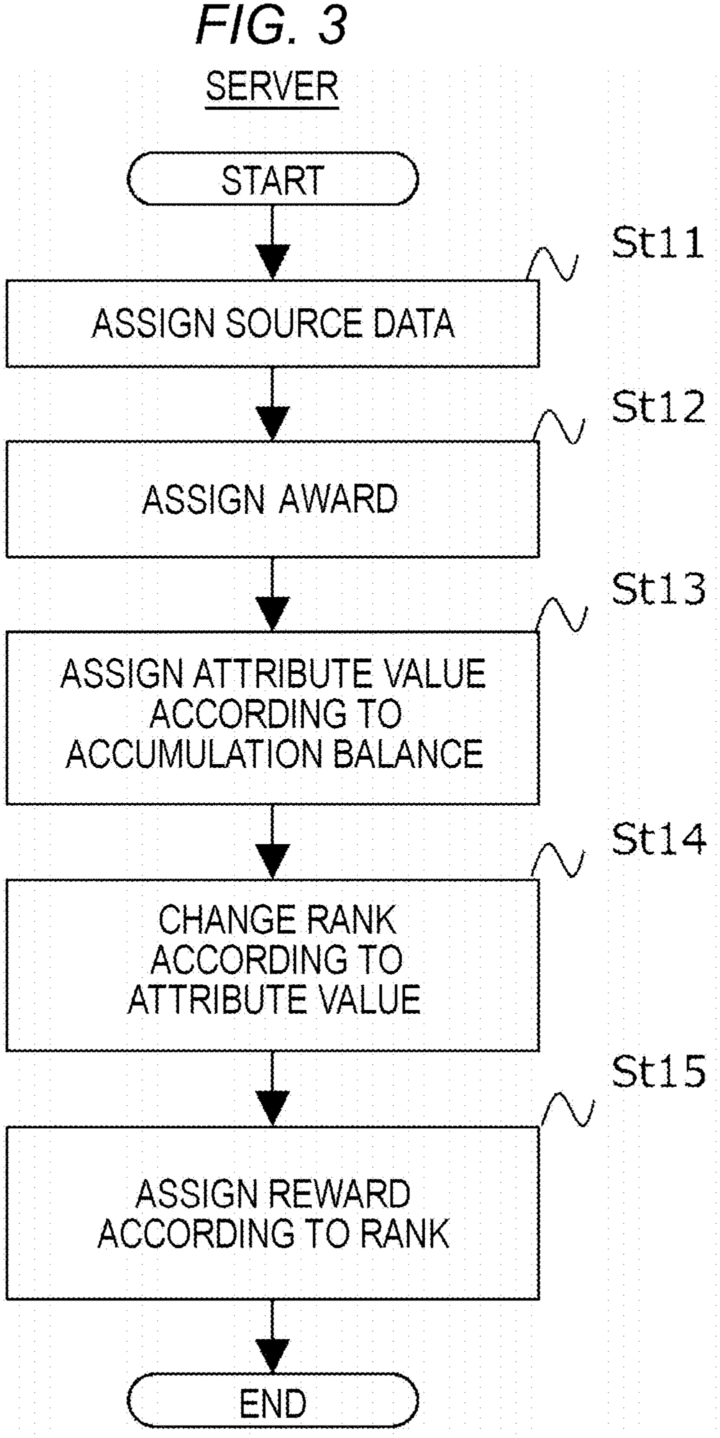
FIG. 3 is a flowchart illustrating a processing example of a source data management program according to at least one embodiment of the present disclosure.

Next, a program execution process according to the first embodiment of the present disclosure will be described. FIG. 3 is a flowchart illustrating a processing example of the source data management program according to at least one embodiment of the present disclosure.

The source data assignment module 101 assigns source data based on a token corresponding to a user (St11).

The award assignment module 102 assigns an award to the user based on the source data (St12).

The attribute value assignment module 104 assigns an attribute value to the user or an object associated with the user according to an accumulation balance of the source data (St13).

The rank management module 105 changes a rank of the user or the object associated with the user according to the attribute value (St14).

The reward assignment module 106 assigns a reward to the user according to the rank (St15).

A token typically means a non-fungible token (NFT). The token may be another type of token such as a fungible token (FT) or a re-fungible token (RFT), as long as there is no contradiction.

A token corresponding to a user means a token issued by the user or a token owned by the user via purchase or transfer of the token. A token owned by a user means a token in which identification information for identifying the user has been written into the distributed ledger of the blockchain network as a current owner of the token. During a period in which transaction information is managed off-chain, the token owned by the user may mean a token that the system executes off-chain management of token owner information assuming that the user is a current owner of the token.

Source data is data that is a source for assigning an award. The source data may be, for example, a numerical value such as points. The source data may be a flag such as a "factory ownership flag" indicating that a factory producing an award is owned. For example, when the flag is in ON state, an award is assigned based on the source data (flag). Hereinafter, description will be made assuming that the source data is points, but the source data is not limited to points. Assignment of the source data based on the token means that the source data is stored in association with the token in the storage device. Assignment of the source data may mean that the source data prepared in advance is allocated to a user or the like.

The source data assigned based on a token is not the token itself. For example, when a type of token is a fungible token such as a crypto asset (virtual currency), the source data assigned based on the token is not the crypto asset (virtual currency) itself.

The source data assigned based on the token is managed as data separate from a crypto asset (virtual currency) that backs up the token. For example, when a user or system administrator converts a digital asset such as shields and swords into an NFT, the issued NFT may include a crypto asset (virtual currency) as backup. When the owner burns the NFT, the owner can obtain some or all of the crypto assets (virtual currencies) that was backup. The source data assigned based on a token in the embodiment means a value that is added to the token and managed and which is different from such a crypto asset (virtual currency) or the like.

The source data assigned based on the token may not always be associated with a user or a player character handled by the user in a game. For example, the source data associated with the token may be a value managed as data separate from a level, an experience point, or the like of a player character.

The award means something which provides a certain benefit, such as an experience point or level up. As a specific example of the award is in-electronic-service currency. The in-electronic-service currency means currency which can be used by a user in an electronic service. For example, when content of the electronic service is a game, the in-game currency corresponds to an award. Here, for example, the user can consume the in-game currency to purchase an item used in the game or start a new game.

Assignment of an award to a user based on the source data may be assignment of an in-electronic-service currency according to an accumulation balance of points, for example, when the source data are points. For example, when an accumulation balance of points is 10 points, the award assignment module 102 may assign in-game currency of 10 units. When the accumulation balance of points is 20 points, the award assignment module 102 may assign in-game currency of 30 units. The assignment is not limited thereto.

The object associated with the user means, for example, a player character or the like that is a character that can be controlled by the user. The object is not limited to a human character. For example, an object in a game, such as a virtual sword or a virtual mountain may be associated with the user.

The attribute value typically means an experience point. The attribute value may be physical strength, intelligence, or the like. The attribute value is a value related to an increase or decrease in a rank to be described below. For example, when an experience point of 10000 is gathered as an attribute value, the rank is raised from 1 to 2.

The attribute value assignment module 104 may assign an attribute value when the user takes a predetermined action. The predetermined action means, for example, login of the user in an electronic service. Here, an attribute value is assigned as a login bonus. The predetermined action may be an action of clearing a predetermined quest or mission in a game, an action of using an item a predetermined number of times, or the like. The predetermined action may be any of other actions.

The rank is a value indicating a degree or a grade of characteristics of a user or an object, such as a player rank, a level of a player character, or sword attack power. The rank may be expressed with a numerical value or may be expressed with an expression other than a numerical value, such as rank A or rank B. A change in rank means an increase in level from 1 to 2 or an increase of a grade of sword attack power from B to A. A decrease in a numerical value indicating a rank is also included in "change in rank".

The reward may be any reward advantageous to a user when using an electronic service. For example, in the case of a game, items, points, or the like which can be used by the user in the game may correspond to the reward. Assignment of a certain right such as extension of a playable time of the game by one week also corresponds to the reward. The reward may be, for example, a change in an attribute value of the user or an object associated with the user, such as a buff or a debuff. For example, an increase in defense power of a protective tool equipped by a user by 10 points or an increase in level of a user character also corresponds to the reward. The reward may be the above-described in-electronic-service currency.

The reward according to the rank means that content of the reward is changed according to the rank. For example, when the reward is an in-electronic-service currency and a rank of a user is 1, 10 of in-electronic-service currency is assigned. When the rank of the user is 2, 30 of in-electronic-service currency is assigned. A reward table in which the content of the reward is determined in advance and registered for each rank may be stored in the storage device.

A token such as an NFT in the present disclosure may be associated with an object. The object mentioned here is, for example, content data such as an image, a video, or a sound.

Figure 4:
FIG. 4 is a conceptual diagram illustrating an example of an object corresponding to a token according to at least one embodiment of the present disclosure.

FIG. 4 is a conceptual diagram illustrating an example of an object corresponding to a token according to at least one embodiment of the present disclosure.

In the embodiment, an object corresponding to a token is a character drawn on an electronic sticker S1. In the illustrated electronic sticker S1, a wizard is drawn as the character. There may be various types of characters. A virtual object other than the character, such as a weapon, may be drawn on the electronic sticker S1.

Figure 5:
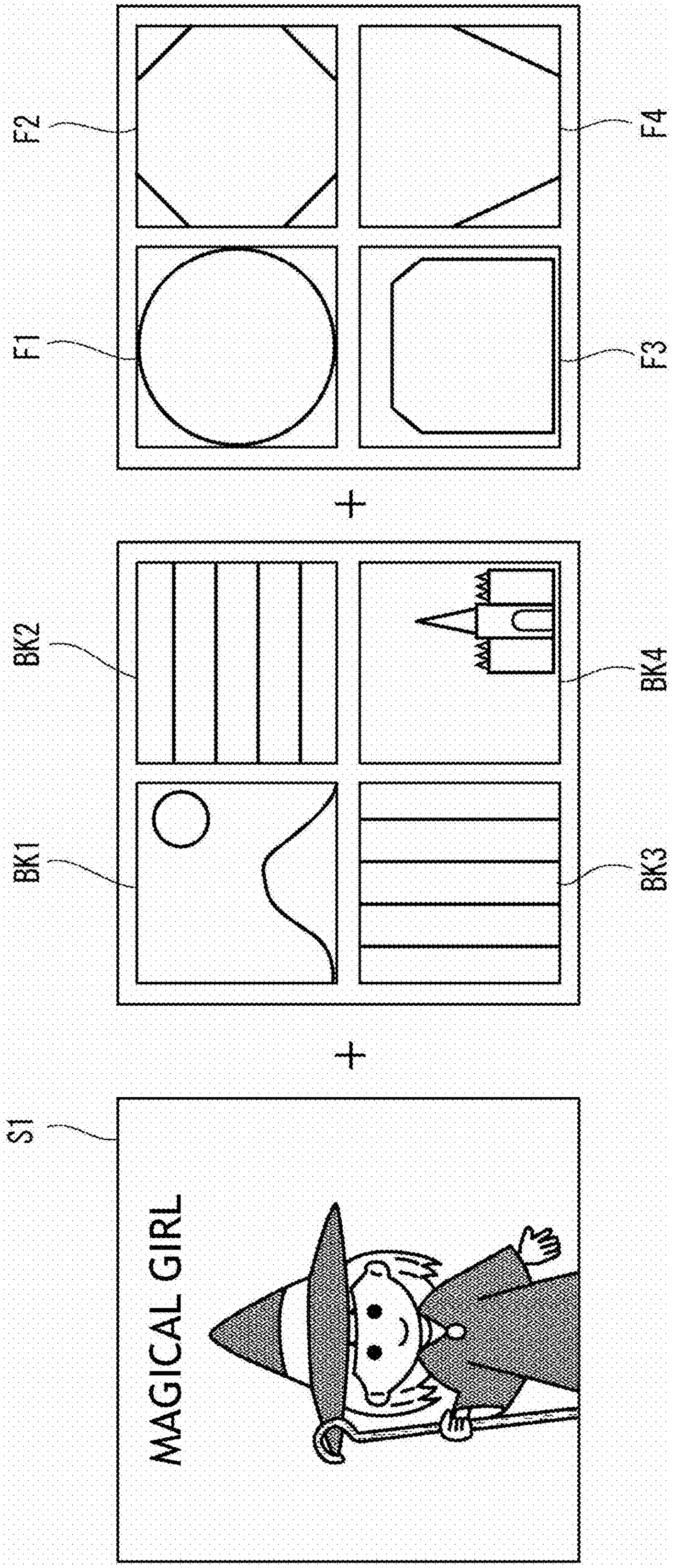
FIG. 5 is a conceptual diagram illustrating an example of a customization process for tokenization target content according to at least one embodiment of the present disclosure.

FIG. 5 is a conceptual diagram illustrating an example of a customization process for tokenization target content according to at least one embodiment of the present disclosure. A user may customize tokenization target content and then purchase a token.

For example, FIG. 5 illustrates an example of a customization process of selecting and combining a background and an electronic sticker frame in an image in which a character is drawn. The user operates the user terminal 20 to select image data in which a desired character is drawn. In the embodiment, the user selects image data on which a wizard is drawn.

Subsequently, the user selects a desired background image from a plurality of background images BK1 to BK4 displayed on the display device of the user terminal 20. Although four background images are drawn in FIG. 5, the number of selectable background images is not limited to four. The types of selectable background images are also not limited to those illustrated in FIG. 5.

Subsequently, the user selects a desired electronic sticker frame from a plurality of electronic sticker frames F1 to F4 displayed on the display device of the user terminal 20. Although four electronic sticker frames are drawn in FIG. 5, the number of selectable electronic sticker frames is not limited to four. The types of selectable electronic sticker frames are also not limited to those illustrated in FIG. 5.

When the user finishes selecting a character, a background, and an electronic sticker frame, information indicating a selection result is transmitted from the user terminal 20 to the server 10. The server 10 generates synthesized image data by synthesizing the selected character, background, and electronic sticker frame. The server 10 executes a process of associating the synthesized image data with a token. For example, as described above, content corresponding to the token can be customized. The server 10 may not issue a token in advance, but may issue a token for the customized content data after the above-described customization process.

[Assignment of Source Data when Permitted]

In step St11, the source data assignment module 101 may assign source data when assignment of the source data for a token is permitted.

The case where the assignment of the source data for the token is permitted is, for example, a case where a source data assignment permission flag managed for the token by the server 10 or the user terminal 20 is in an ON state. Various conditions that an OFF state (for example, value=0) of the source data assignment permission flag becomes an ON state (for example, value=1) are conceivable according to specifications. For example, when an electronic sticker in which a character is drawn is converted into an NFT, the source data management system 100 may change the source data assignment permission flag from the OFF state to the ON state when a predetermined holder to be described below is set to the electronic sticker converted into an NFT. The source data management system 100 may control the ON state and the OFF state of the source data assignment permission flag based on other conditions.

The source data management system 100 manages permission or non-permission of assignment of the source data separately for each token. Here, the source data management system 100 may collectively manage permission and non-permission of the assignment of the source data for each group configured by a plurality of tokens.

Figure 6:
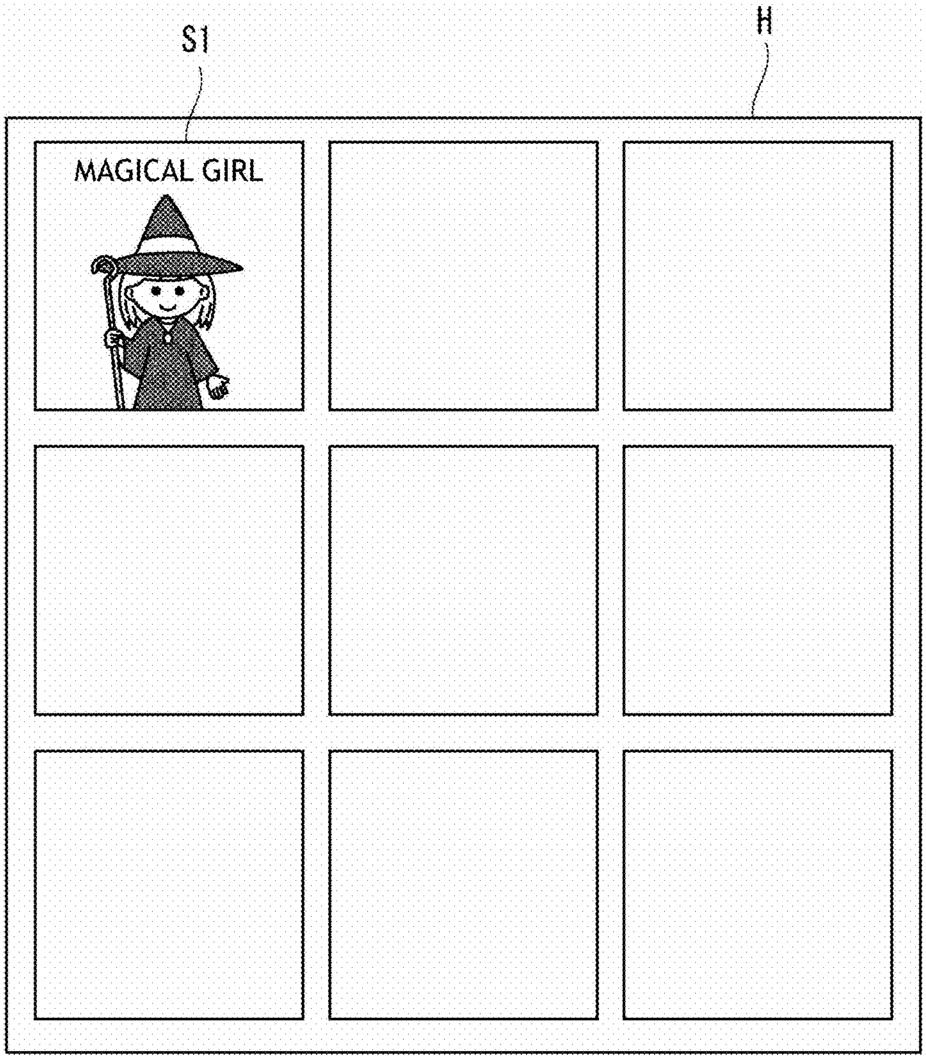
FIG. 6 is a conceptual diagram illustrating an example of a holder according to at least one embodiment of the present disclosure.

FIG. 6 is a conceptual diagram illustrating an example of a holder H according to at least one embodiment of the present disclosure. The holder H is displayed by the display device of the user terminal 20. The holder H is provided with a plurality of slots for setting electronic stickers. The holder H illustrated in FIG. 6 is provided with a total of 9 slots of 3 columns×3 rows. The number and arrangement of the slots in the holder H are not limited to those illustrated in FIG. 6.

The user operates the user terminal 20 to set an object (here, the electronic sticker S1) corresponding to their token in the holder H. FIG. 6 illustrates a state where the electronic sticker S1 is set in a top left slot of the holder H.

When the electronic sticker S1 is set in the holder H, the source data assignment permission flag for the token corresponding to the electronic sticker S1 is changed from the OFF state to the ON state.

When the assignment of the source data for the token is permitted, that is, when the source data assignment permission flag is in the ON state in the embodiment, the source data assignment module 101 assigns the source data.

The assignment of the source data for one token has been described above. However, the source data assignment module 101 may manage whether assignment of the source data is permitted in units of groups configured by a plurality of tokens. For example, when the assignment of the source data for each token included in a group to which the token belongs is permitted, the source data assignment module 101 may assign each piece of source data associated with each token included in the group.

Here is a specific example. It is assumed that one adventurer group includes a hero, a warrior, and a wizard. When an object corresponding to a first token representing a hero character, an object corresponding to a second token representing a warrior character, and an object corresponding to a third token representing a wizard character are all set in the holder H, the source data assignment permission flags for the first to third tokens may all enter the ON state. Conversely, when the object corresponding to the first token representing the hero character and the object corresponding to the second token representing the warrior character are set in the holder H and the object corresponding to the third token representing the wizard character is not set in the holder H, the source data assignment permission flags for the first to third tokens may all enter the OFF state.

[Assignment of Source Data According to Elapsed Time]

In step St11, the source data assignment module 101 may assign the source data according to an elapsed time. For example, when the source data is points, the source data assignment module 101 assigns 1 point whenever 24 hours passes. The source data assignment module 101 further assigns 10 points whenever 1 week passes. Those skilled in the art may determine how many points are assigned according to how long the period is.

For each token, an upper limit may be provided in the source data which can be assigned. For example, when the source data is points, an upper limit of the number of accumulable points can be set to 20 points for one token. The upper limit value is not limited to 20 points and those skilled in the art may appropriately determine the upper limit value.

[Management of Accumulation Balance]

The accumulation balance management module 103 changes an accumulation balance of the source data when the correspondent relation between the user and the token is canceled.

The case where the correspondent relation between the user and the token is canceled means, for example, a case where the association between the user and the token is lost, for example, as the user sells an NFT to another person.

The change in the accumulation balance of the source data means, when the source data is points, resetting of the accumulation balance from 30 to 0, a decrease of the accumulation balance from 30 to 10, or the like, for example. The accumulation balance management module 103 may increase the accumulation balance. An increase in the accumulation balance is also included in the change in the accumulation balance.

Figure 7:
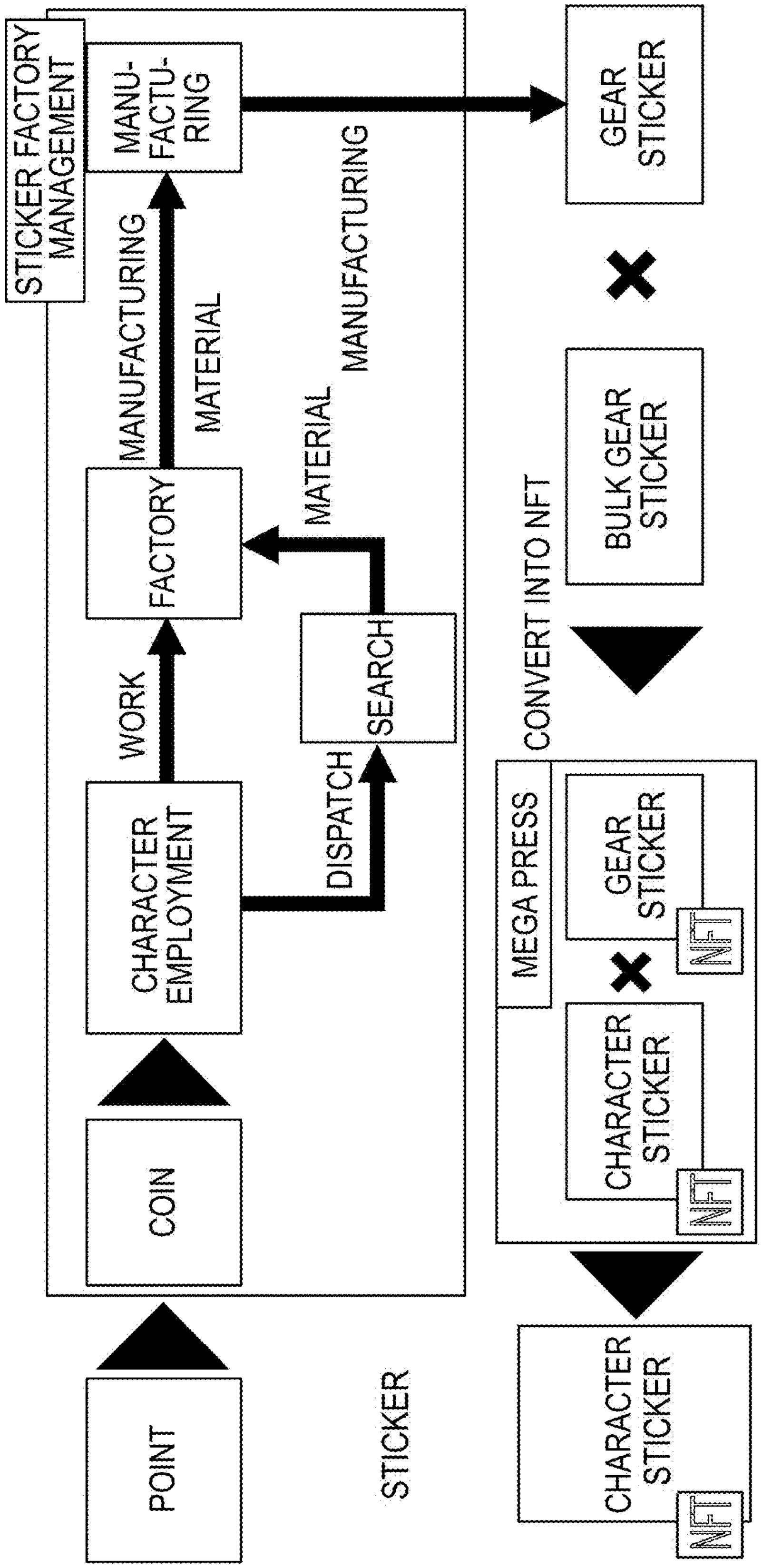
FIG. 7 is a conceptual diagram illustrating an example of a game cycle at which the source data management system is utilized according to at least one embodiment of the present disclosure.

FIG. 7 is a conceptual diagram illustrating an example of a game cycle at which the source data management system is utilized according to at least one embodiment of the present disclosure.

A user plays a factory management game in which the user manages a manufacturing factory of a gear sticker. A gear sticker in the factory management game is an electronic sticker for customizing an existing electronic sticker by addition such as superimposing the gear sticker on the existing electronic sticker. For example, there is a motion gear sticker for adding a motion to an existing electronic sticker, a pattern gear sticker for adding a pattern to an existing electronic sticker, a background gear sticker for adding a background to an existing electronic sticker, a sound gear sticker for adding a sound to an existing electronic sticker, or the like.

The source data in the example is points. The source data assignment module 101 assigns points based on a token corresponding to a user. In the example, the token corresponding to the user is an NFT associated with an electronic sticker owned by the user.

The award assignment module 102 assigns an award to the user based on the points. In the example, the award is coins.

When the user consumes coins in the factory management game, the user can employ a character, make a character work in a factory, dispatch a character to travel for material searching, or the like. In the factory, a manufacturing material for an electronic sticker can be generated using a material (for example, a virtual mineral) obtained through material searching or the like. The user manufactures a gear sticker using the manufacturing material. Another type of gear sticker may be manufactured according to the used manufacturing material.

In the factory management game, the user may generate a new character sticker using a character sticker and a gear sticker which are existing electronic stickers obtained by a method such as purchase in an NFT market. Here, a new character sticker is an electronic sticker to which a motion, a pattern, a background, a sound, or the like is further added by combining the character sticker and the gear sticker which are existing electronic stickers.

The source data management system 100 may generate a new character sticker using a gear sticker converted into an NFT. The game cycle illustrated in FIG. 7 shows an example in which a gear sticker converted into an NFT is used. The user designates a gear sticker and a bulk gear sticker which is an item necessary to convert the gear sticker into an NFT. The source data management system 100 converts a gear sticker into an NFT based on the gear sticker and the bulk gear sticker. That is, a gear sticker not converted into an NFT is associated with an NFT on a blockchain. When the user combines a character sticker and the gear sticker converted into an NFT, which are the existing electronic stickers, the source data management system 100 generates a new character sticker. The generation of the new character sticker by combining the character sticker and the gear sticker is expressed as "mega press" in the game.

As described above, the embodiments of the present application address one or more deficiencies. The advantageous effect in each embodiment is a non-limiting effect or an example of the effect.

In each of the above-described embodiments, the user terminal 20 and the server 10 executes the various processes described above according to various control programs (for example, the source data management program) stored in their own storage devices. Other computers that are not limited to the user terminal 20 and the server 10 may execute the above-described various processes according to various control programs (for example, the source data management program) stored in their own storage devices.

The configuration of the source data management system 100 is not limited to the configurations described as examples of the above-described embodiments. For example, the server may execute some or all of the processes described as the processes executed by the user terminal, or the user terminal may execute some or all of the processes described as the processes executed by the server. The user terminal may be configured to include a part or all of the storage unit (storage device) included in the server. That is, in the source data management system 100, one of the user terminal and the server may have some or all of the functions provided by the other.

Programs may be configured to cause a single device not including a communication network to implement some or all of the function described as examples of the above-described embodiments.

[Note]

The foregoing embodiments have been described so that those who have ordinary knowledge in the field to which the inventions belong can implement the inventions.

[1] A source data management program causing a computer to implement:

a source data assignment function of assigning source data based on a token corresponding to a user; and an award assignment function of assigning an award to the user based on the source data.

According to the foregoing source data management program, it is possible to expand token utilization methods and provide various services to the user.

[2] In the source data assignment function, a function of assigning the source data when the source data is permitted to be assigned for the token is implemented. Accordingly, an assignment of the source data can be flexibly set such that, for example, the source data is assigned only while an object corresponding to the token is set in a holder.

[3] In the source data assignment function, the source data is assigned according to an elapsed time. For each token, there is an upper limit in the assignable source data. Accordingly, the source data is not assigned only once, but more source data is assigned as the user uses an electronic service longer. Therefore, the user can be motivated to use the electronic service.

[4] An accumulation balance management function of changing an accumulation balance of the source data when a correspondent relation between the user and the token is canceled is further implemented. Accordingly, for example, an accumulation balance of the source data is changed depending on whether a user continues to store a token such as an NFT or releases the token. Therefore, for example, the user can be motivated to continue to store the NFT. Conversely, the user can be motivated to release the NFT.

[5] An attribute value assignment function of assigning an attribute value to the user or an object associated with the user according to an accumulation balance of the source data is further implemented. Accordingly, the user can be motivated to accumulate the source data or can be motivated not to accumulate the source data.

[6] In the attribute value assignment function, a function of assigning the attribute value when the user takes a predetermined action is implemented. Accordingly, in the electronic service, the user can be urged to do the predetermined action.

[7] A rank management function of changing a rank of the user or an object associated with the user according to the attribute value is further implemented. Accordingly, in the electronic service, the user can be urged to do an action of setting the attribute value to a more advantageous value.

[8] A reward assignment function of assigning a reward to the user according to the rank is further implemented. Accordingly, to gain a better reward, the user can be urged to do an action that leads to a change in the rank in the electronic service.

[9] The reward includes in-electronic-service currency. Accordingly, the user can acquire the in-electronic-service currency according to the rank. Therefore, the user can be urged to do an action that leads to acquiring more in-electronic-service currency, in particular, an action that leads to a change in the rank.

[10] A source data management system that includes a communication network, a server, and a user terminal, the system including:

a source data assignment means configured to assign source data based on a token corresponding to a user; and an award assignment means configured to assign an award to the user based on the source data.

According to the foregoing source data management system, it is possible to expand token utilization methods and provide various services to the user.

[11] A source data management method implemented by a computer, the method including:

an source data assignment process of assigning source data based on a token corresponding to a user; and an award assignment process of assigning an award to the user based on the source data.

According to the foregoing source data management method, it is possible to expand token utilization methods and provide various services to a user.

According to one embodiment of the present disclosure, the present disclosure is useful as a source data management program, a source data management system, and a source data management method capable of expanding token utilization methods and provide various services to a user.

What is claimed is:

1. A non-transitory computer-readable medium that stores a source data management program including instructions, when executed by one or more processors, causing a computer to perform operations comprising:

assigning source data based on a token corresponding to a user, the source data being stored in association with the token and managed as data separate from the token, assigning the source data including:

storing, separately for each token, a source data assignment permission flag having an OFF state indicating that assignment of the source data for the token is not permitted and an ON state indicating that assignment of the source data for the token is permitted;

changing the source data assignment permission flag from an OFF state to an ON state when an object corresponding to the token is set in a slot of a holder displayed by a user terminal; and assigning the source data based on the token when the source data assignment permission flag is in the ON state;

assigning the award to the user based on an accumulation balance of the source data; and changing the accumulation balance of the source data when a correspondence relationship between the user and the token is canceled.

2. The non-transitory computer-readable medium according to claim 1, wherein said assigning the source data is performed when the assignment of the source data for the token is permitted.

3. The non-transitory computer-readable medium according to claim 1, wherein said assigning the source data is performed according to an elapsed time, and wherein an amount of the source data to be assigned based on each token has an upper limit.

4. The non-transitory computer-readable medium according to claim 1, wherein the operations further comprise assigning an attribute value to the user or an object associated with the user according to the accumulation balance of the source data.

5. The non-transitory computer-readable medium according to claim 1, wherein the holder includes a plurality of slots for setting electronic stickers, and the object corresponding to the token is an electronic sticker set in one of the plurality of slots, and wherein changing the source data assignment permission flag from the OFF state to the ON state is performed based on the electronic sticker set in one of the plurality of slots of the holder displayed by the user terminal.

6. A source data management system comprising:

a communication network;

a server;

a user terminal; and one or more processors configured to:

assign source data based on a token corresponding to a user, the source data being stored in association with the token and managed as data separate from the token, assigning the source data including:

storing, separately for each token, a source data assignment permission flag having an OFF state indicating that assignment of the source data for the token is not permitted and an ON state indicating that assignment of the source data for the token is permitted;

changing the source data assignment permission flag from the OFF state to the ON state when an object corresponding to the token is set in a slot of a holder displayed by the user terminal; and assigning the source data based on the token when the source data assignment permission flag is in the ON state;

assign an award to the user based on an accumulation balance of the source data; and change the accumulation balance of the source data when a correspondence relationship between the user and the token is canceled.

7. A source data management method comprising:

assigning source data based on a token corresponding to a user by a computer, the source data being stored in association with the token and managed as data separate from the token, assigning the source data including:

storing, separately for each token, a source data assignment permission flag having an OFF state indicating that assignment of the source data for the token is not permitted and an ON state indicating that assignment of the source data for the token is permitted;

changing the source data assignment permission flag from the OFF state to the ON state when an object corresponding to the token is set in a slot of a holder displayed by a user terminal; and assigning the source data based on the token when the source data assignment permission flag is in the ON state;

assigning an award to the user based on an accumulation balance of the source data by the computer; and changing the accumulation balance of the source data when a correspondence relationship between the user and the token is canceled.

* * * * *